United States Patent
Ritter et al.

(10) Patent No.: US 6,721,292 B1
(45) Date of Patent: Apr. 13, 2004

(54) METHOD, MOBILE STATION AND BASE STATION FOR TIME SYNCHRONIZATION OF THE MOBILE STATION IN A RADIO COMMUNICATIONS SYSTEM

(75) Inventors: Gerhard Ritter, Thaining (DE); Anja Klein, München (DE); Michael Färber, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,094

(22) PCT Filed: Jun. 17, 1998

(86) PCT No.: PCT/DE98/01652

§ 371 (c)(1),
(2), (4) Date: Dec. 16, 1999

(87) PCT Pub. No.: WO98/58463

PCT Pub. Date: Dec. 23, 1998

(30) Foreign Application Priority Data

Jun. 17, 1997 (DE) .......................................... 197 25 580

(51) Int. Cl.[7] .............................. H04B 7/216; H04J 3/06
(52) U.S. Cl. ...................... 370/335; 370/347; 370/350
(58) Field of Search .............................. 370/319, 320, 370/324, 321, 326, 335, 336, 342, 343, 345, 347, 350

(56) References Cited

U.S. PATENT DOCUMENTS

| | | | | |
|---|---|---|---|---|
| 5,481,533 A | * | 1/1996 | Honig et al. | |
| 5,539,730 A | * | 7/1996 | Dent | |
| 5,566,168 A | * | 10/1996 | Dent | |
| 5,592,490 A | * | 1/1997 | Barratt | |
| 5,594,941 A | * | 1/1997 | Dent | |
| 5,828,658 A | * | 10/1998 | Ottersten | |
| 5,887,256 A | * | 3/1999 | Lu | |
| 5,903,549 A | * | 5/1999 | von der Embse | |

FOREIGN PATENT DOCUMENTS

| | | |
|---|---|---|
| DE | 195 49 148 A1 | 7/1997 |
| EP | 0 767 557 A1 | 6/1989 |
| EP | 0 551 803 A1 | 7/1993 |

OTHER PUBLICATIONS

Mobile Radio Communicatins, Steele, pp. 691–698.
Paging in UMTS, Lenti, pp. 405–410.
Evolution Towards UMTS, Oudelaar, pp. 852–856.

* cited by examiner

*Primary Examiner*—Chi Pham
*Assistant Examiner*—Afsar M. Qureshi
(74) *Attorney, Agent, or Firm*—Bell, Boyd & Lloyd LLC

(57) ABSTRACT

A radio communications system provides frequency channels which are formed both by time slots and by broadband frequency ranges, and in which information from a plurality of connections is simultaneously transmitted between mobile stations and base stations wherein it is possible to distinguish the information from different connections in accordance with a connection-specific fine structure. Frequency channels are repeatedly provided for time synchronization of the mobile stations in the downward direction in which a signal form is transmitted in addition to information from further connections. The mobile station to be synchronized determines from received signals at least one instant of the arrival of the signal form, which is subsequently used by the mobile station for time synchronization. The system is advantageously applied, for example, in TDD mode for the third mobile communications generation which combines a TDMA and CDMA subscriber separation method.

13 Claims, 4 Drawing Sheets

(prior art)

METHOD, MOBILE STATION AND BASE STATION FOR TIME SYNCHRONIZATION OF THE MOBILE STATION IN A RADIO COMMUNICATIONS SYSTEM

BACKGROUND OF THE INVENTION

1. Field of the Invention

The present invention relates, generally to a method for time synchronization of a mobile station in a radio communications system and more specifically to a mobile station and to a base station which can carry out such method.

2. Description of the Prior Art

The design of digital radio communications systems is shown in J. Oudelaar, "Evolution towards UMTS", PIMRC 94, 5th IEEE International Symp. on Personal, Indoor and Mobile Radio Communications, The Hague, NL, Sep. 18–22 1994, pages 852–856, and M. Lenti, H. Hageman, "Paging in UMTS", RACE Mobile Telecommunications Workshop, Vol. 1, Amsterdam, NL, May 17–19 1994, pages 405–410.

The presently known mobile radio system GSM (Global System for Mobile Communications) is a radio communications system with a TDMA component for subscriber separation (time division multiple access). User information from the subscriber connections is transmitted in time slots in accordance with a frame structure. The transmission is performed in blocks. Furthermore, frequency channels (SCH synchronization channels) matched to the timing pattern of the frame structure and serving the purpose of time synchronization for the mobile stations are known in the downward direction from the GSM mobile radio systems. In this frequency channel, a mobile station can evaluate transmitted data for the purpose of self-synchronization. Such self-synchronization is disclosed in EP 0 551 803 A1.

A method for time synchronization for a mobile station is known from EP 0 767 557 A1. The connections are separated in a pure TDMA system by time slots and frequency bands. The base station transmits a frequency channel for, time synchronization (SCH) in a fixed fashion at regular intervals. This frequency channel for time synchronization is always arranged at the same position in a multiframe; for example, in each case in the first time slot of each tenth TDMA frame. A 64-bit training sequence contained in the frequency channel for time synchronization, and the location of its arrangement within the TDMA frames and time slot, are known to the mobile station.

DE 195 49 148.3 discloses a mobile communications system which uses a TDMA/CDMA subscriber separation (CDMA code division multiple access), and applies at the receiving end a JD method (joint detection) in order to undertake with knowledge of spread codes of a plurality of subscribers, improved detection of the transmitted user information. Information from a plurality of user data connections which can be distinguished by their spread code are transmitted simultaneously in one frequency channel (TCH traffic channel). However, the division of specific frequency channels for synchronization purposes results in a large loss in capacity in comparison with the GSM system since the frequency range used for a frequency channel is a more broadband one.

It is an object of the present invention, therefore, to provide a method and apparatus which permit time synchronization in conjunction with low consumption of radio resources in a TDMA radio communications system.

SUMMARY OF THE INVENTION

A radio communications system, for example a TDMA/CDMA radio communications system, provides frequency channels which are formed by time slots and by broadband frequency ranges, and in which information from one or more connections is transmitted simultaneously between mobile stations and base stations; it being possible to distinguish the information from different connections in accordance with a connection-specific fine structure. However, it is also possible to allocate to a connection a plurality of different fine structures which are recombined at the receiving end.

According to the present invention, frequency channels in which a known signal form is transmitted, in addition to information from further connections, are temporarily repeatedly provided for time synchronization for the mobile stations in the downward direction. The known signal form is transmitted by a first base station, while the further connections are supplied by other base stations. As an alternative to this, it is also possible for an individual base station to transmit the known signal form for synchronization, as well as information from the further connections, in one frequency channel. At least one instant of the arrival of the signal form is determined by the mobile station to be synchronized from received signals, which is subsequently used by the mobile station for time synchronization.

The radio resources of the air interface between the base station and mobile stations can be better used by virtue of the fact that the signal form is transmitted in addition to information from further connections. Because information can be distinguished in accordance with an impressed fine structure, a time slot is not blocked solely by the synchronization, rather, it can be used multifariously. The further connections can, in this case, be user data connections or signaling connections. In a simultaneous network, that is to say adjacent base stations that use the same frequency range, the further connections are offered, for example, by the adjacent base station.

In accordance with an embodiment of the present invention, the signal form is designed as a training sequence of a message block with data to be transmitted. Thus, message blocks which transmit information for various purposes can be used by configuring a specific training sequence for time synchronization. The capacity of the air interface is, thereby/ further increased. The training sequence can be used further for channel assessment.

The signal form is advantageously spread with the aid of an individual spread code, wherein it is possible for the information on the presence of a signal form to be included in the spread code for time synchronization. The signal form also can be interpreted as a sequence of chips which generate a bandwidth which fills up the frequency range. An additional outlay on processing at the receiver is eliminated by virtue of the fact that the message block with the data for time synchronization can be processed together with the remaining message blocks by despreading.

In accordance with an embodiment of the present invention, the at least one instant is determined by determining the correlation between a received signal and a reference sequence known in the receiver. A correlation peak determined in this case specifies, f or example, the temporal mean of a time slot. Thus, it can serve the purpose of further orientation with reference to the frame structure of the air interface. Alternatively, the at least one instant can be determined by signal-matched filtering of a received signal.

In order to increase the accuracy of time synchronization, the instant of the arrival of the signal form is advantageously determined several times and averaging of the instants is carried out for the purpose of frequency synchronization. The averaging reduces the influence of single errors.

For frame synchronization of the mobile station, the signal form, which is expressed, for example, as a digital symbol sequence, includes data on a frame structure of the frequency channels in specific time slots. The signal form, therefore, also can be used to transmit this information without further loss of capacity. The symbol sequence at specific instants of hyperframes and/or superframes advantageously differs from the symbol sequence in the remaining time slots of the frequency channel for time synchronization. As an alternative, however, it is also possible for the purpose of frame identification for additional symbols to supplement the symbol sequence at specific instants; for example, at the start of hyperframes and/or superframes.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
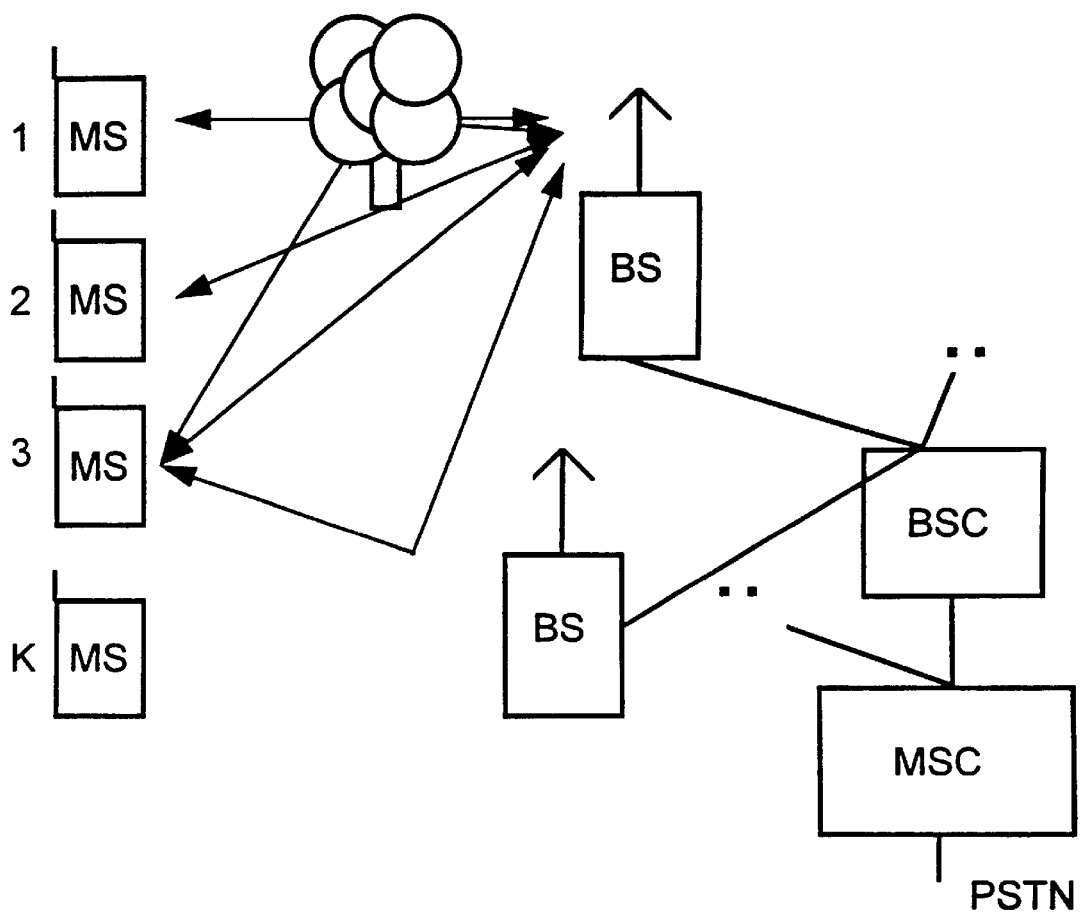
FIG. 1 shows a schematic block diagram of a mobile radio network.

The radio communications system represented in FIG. 1 corresponds in structure to a known GSM mobile radio network which includes a multiplicity of mobile switching centers MSC which are networked with one another and which provide the access to a landline network PSTN. Furthermore, these mobile switching centers MSC are respectively connected to at least one base station controller BSC. Each base station controller BSC in turn, permits connection to at least one base station BS. Such a base station BS is a radio station which can establish a message connection to mobile stations MS via an air interface.

By way of example, FIG. 1 represents three connections for transmitting both user information and signaling information between three mobile stations MS and a base station BS. An operating and maintenance center OMC implements control functions and maintenance functions for the mobile radio network, or for parts thereof. The functionality of this structure can be transferred to other radio communications systems in which the present invention can be used.

Figure 2:
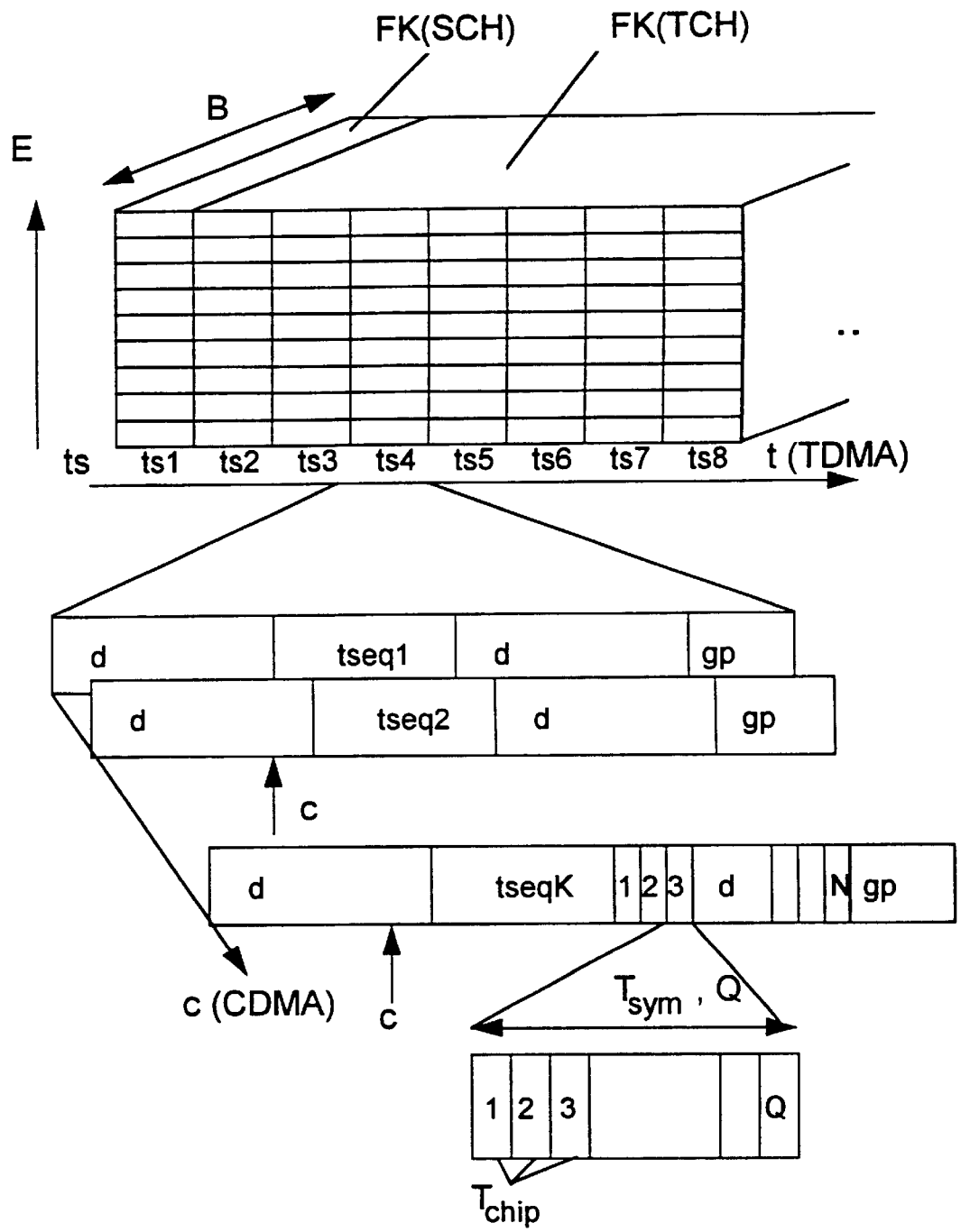
FIG. 2 shows a schematic representation of the frame structure of a radio transmission mobile radio network.

The frame structure of the radio transmission can be seen in FIG. 2. Partitioning of a broadband frequency range (for example, the bandwidth B=1.6 MHz or B=5 MHz) into a plurality of time slots ts (for example, 8 time slots ts1 to ts8 or (not represented) 16 time slots) is provided in accordance with a TDMA component. Each time slot ts within the frequency range B forms a frequency channel FK. Within the frequency channels TCH, which alone are provided for transmitting user data, information from a plurality of connections is transmitted in message blocks.

These message blocks for transmitting user data include sections with data d in which sections with training sequences tseq1 to tseqK known at the receiving end are embedded. The data d is spread in a connection-specific fashion with a fine structure (a subscriber code c), with the result that at the receiving end K connections can be separated by these CDMA components, for example.

The spreading of individual symbols of the data d has the effect that Q chips of duration $T_{chip}$ are transmitted within the symbol duration $T_{sym}$. The Q chips in this case form the connection-specific subscriber code c. Furthermore, a protection time gp for compensating different signal delays of the connections is provided within the time slot ts.

Within a broadband frequency range B, the sequential time slots ts are subdivided in accordance with a frame structure. Thus, eight time slots ts are combined to form a frame wherein, for example, a time slot ts4 of the frame forms a frequency channel TCH for user data transmission and is repeatedly used by a group of connections. A frequency channel SCH for time synchronization of the mobile stations MS is not inserted in every frame, but rather at a prescribed instant within a multiframe. The capacity made available therefor by the mobile radio network determines the spacings between the frequency channels SCH for time synchronization.

Figure 3:
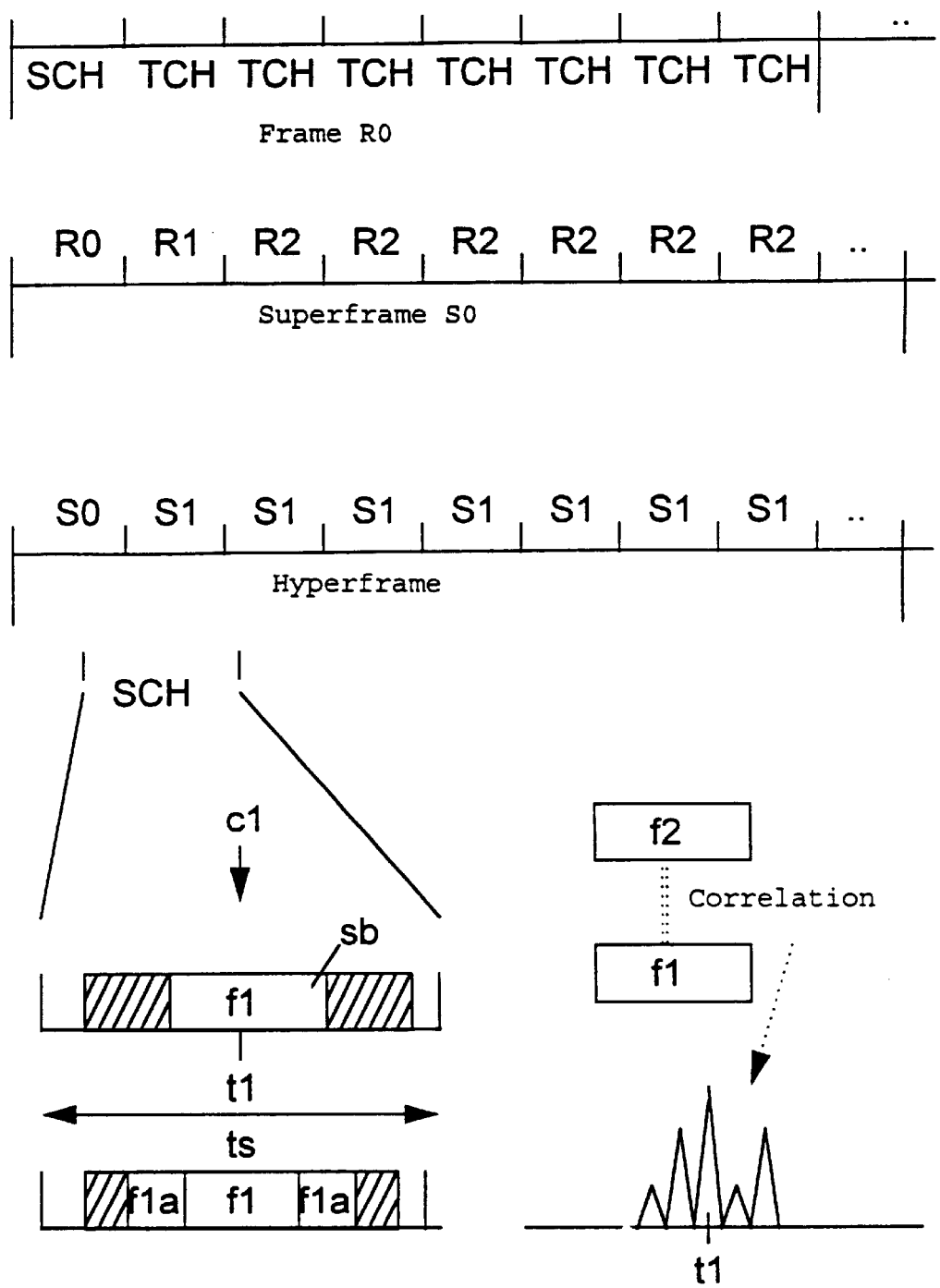
FIG. 3 shows a schematic representation of the structure of a frequency channel for time synchronization.

The structure of a frequency channel SCH for time synchronization is shown with the aid of FIG. 3. The broadband frequency range B in the frequency band of an organization channel of the corresponding cell of the mobile radio network is part of a frame R0 such frame R0 includes a frequency channel SCH for time synchronization (in which, however, further signaling and user data connections also can be handled) and, in the following time slots, exclusively frequency channels TCH for user data transmission and signaling data transmission, respectively.

This frame R0 is, in turn, part of a superframe S0 which, in addition to the frame R0 includes both a frame R1 having frequency channels FK with further cell-related information and a frame R2 with user data. A hyperframe includes, in turn, a plurality of superframes S0, S1, of which at least one contains a frequency channel SCH for time synchronization.

Transmitted in the downward direction in a time slot ts of the frequency channel SCH for time synchronization is a synchronization block sb which contains as training sequence a signal form f1 which is known in the mobile stations MS. The time form f1 is embedded in further information (user or signaling information) to be transmitted. The synchronization block sb is spread with the aid of an individual code c1. The further connections to the user or signaling information are transmitted by other base stations BS in the same frequency range B which is frame-synchronized with the base station BS which transmits the signal form f1. As an alternative, or additionally, the base station BS transmitting the signal form f1 also use the time slot ts for further connections. This overlapping of a plurality of signals, which can be distinguished by the subscriber code c forming the connection-specific fine structure, nevertheless can be resolved as explained below.

An alternative embodiment for the synchronization block sb provides, in addition to the signal form designed as symbol, sequence symbols f1*a* which serve the purpose of frame synchronization. With the aid of these additional symbols f1*a*, which are transmitted in the first frame R0 of a superframe S0, a receiving mobile station MS can carry out an identification of the current position of the time slot ts in the frame structure. The base station BS radiates to the synchronization block sb a transmitter power which is matched for the purpose of power control to the received power of the remaining existing connections.

An instant t1 is determined at the receiving end for time synchronization by evaluating the signal form f1. The instant t1 specifies approximately the middle of the signal form. Since the transmission of the synchronization block sb likewise takes place, for example, in the middle of the corresponding time slot ts, the middle of a time slot ts can be determined at the receiving end given a correct evaluation. For this purpose, the mobile station MS in the corresponding frequency channel SCH continuously attempts to determine the instant t1 of the arrival of the signal form f1 by correlating the received signal with a reference sequence f2 which corresponds to the signal form f1. A correlation peak indicates; in this case the instant t1 which is adopted subsequently as the middle of the time slot ts.

Figure 4:
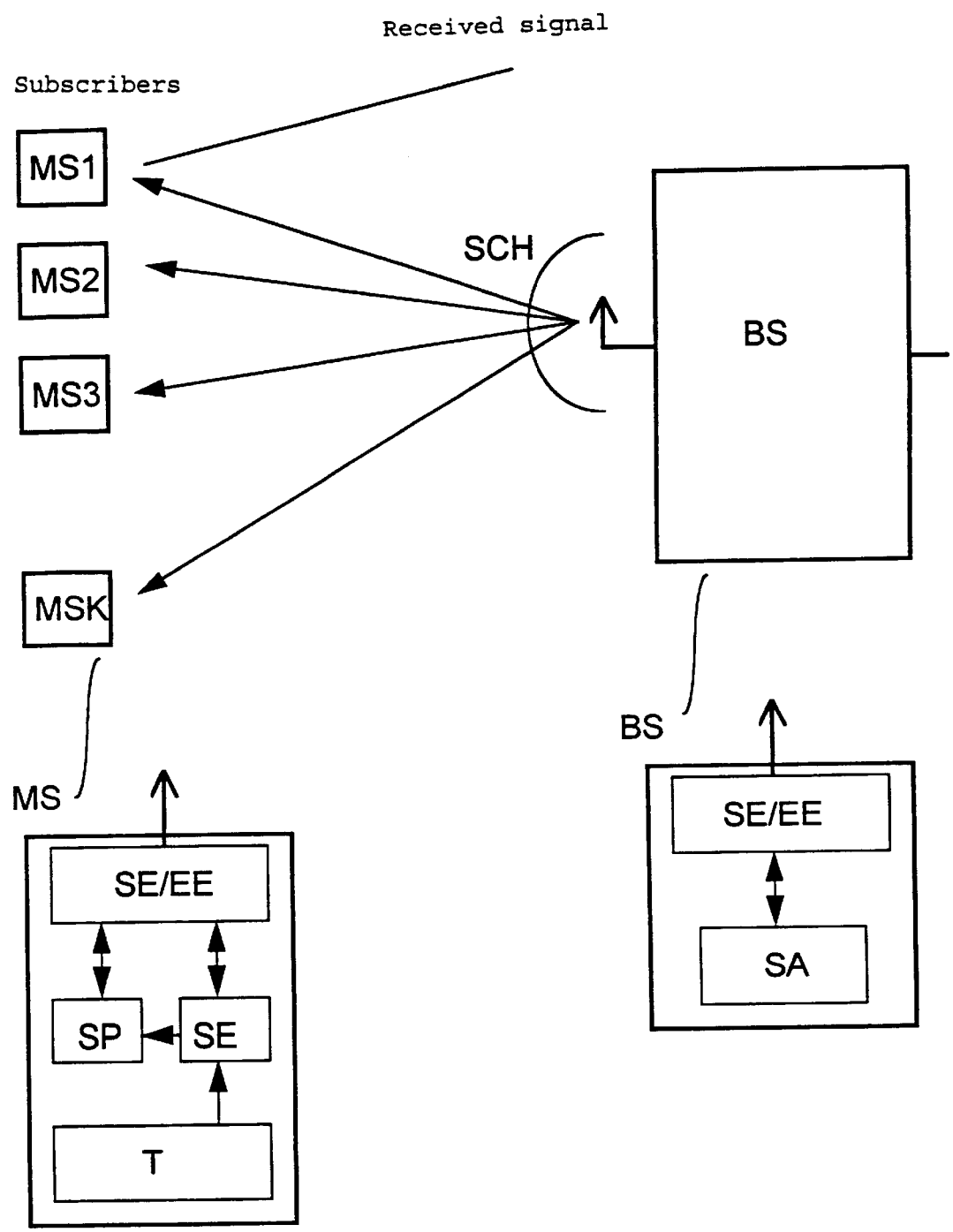
FIG. 4 shows block diagrams of mobile stations and a base station with radio transmission in a downward direction.

FIG. 4 shows the radio transmission in the downward direction from the base station BS to mobile stations MS1 to MSK. The mobile stations MS firstly determine one or more frequency ranges B with a sufficiently high or maximum received power. These are the frequency ranges B of the nearest base station BS in whose cell the mobile station MS is instantaneously located.

Mobile stations MS1 to MSK evaluate received signals in these frequency ranges B and carry out continuous correlation of the values of the respective received signal with the reference sequence f2. Given a sufficiently large correlation peak, the instant t1 determined for the arrival of the signal form f1 is selected as reference point for time synchronization and an internal time reference of the mobile station MS is tuned. At the same time, the corresponding frequency channel SCH can be used for a subsequent frequency synchronization.

The base station BS includes a transceiver SE/EE which subjects the transmitted signals, which are to be emitted to digital-to-analog conversion, converts from the baseband into the frequency range B of the emission, and modulates and amplifies the transmitted signals. A signal generating device SA has previously assembled the transmitted signals, for example synchronization blocks sb, and assigned them to the corresponding frequency channels SCH, TCH.

The mobile station MS contains an operating panel T, a signal processing device SP, a control device SE and a transceiver SE/EE. On the operating panel T, the subscriber can make inputs, including an input for activating the mobile station MS, which thereupon must first carry out synchronization with the mobile radio network surrounding it.

The control device SE then receives this request and causes the signal processing device SP to evaluate signals received via the transceiver SE/EE such that, as already described, the appropriate frequency range B is selected and correlation is carried out until the signal form f1 is successfully found.

For the purpose of signal processing, the received signals are converted into symbols with a discrete store of values; for example, digitized. This signal processing device SP, which as a digital signal processor contains a JD processor for detecting both the user information and the signaling information using the JD-CMDA method (joint detection), also evaluates the synchronization blocks sb.

The evaluation is performed by determining the correlation between the received signals and the reference sequence f2 known in the mobile station MS. In this case, the instant t1 of maximum correlation, which subsequently serves the purpose of temporal synchronization, also is determined. Alternatively, it also is possible to apply signal-matched filtering or another linear algorithm (for example, in accordance with the zero forcing or the minimum square error criterion). In order to increase the accuracy of the time synchronization, the mobile station MS repeats the determination of the instant t1 of the arrival of the synchronization block sb and averages the values thereof.

Furthermore, instead of a single correlator or a signal-matched filter, it also is possible to perform an evaluation in a filter bank for various frequency offsets and Doppler shifts.

Although the present invention has been described with reference to specific embodiments, those of skill in the art will recognize that changes may be made thereto without departing from the spirit and scope of the invention as set forth in the hereafter appended claims.

We claim:

1. A method for time synchronization of a mobile station of a radio communications system, the method comprising the steps of:

providing frequency channels in the radio communications system which are formed both by time slots and by broadband frequency ranges wherein information from one or more connections is transmitted simultaneously in the frequency channels between mobile stations and base stations, and wherein the information from different connections is distinguishable by spreading codes;

providing one of the frequency channels for repeated time synchronization of the mobile stations in a downward direction;

transmitting, in addition to information from further connections, a plurality of different known signal forms within the one frequency channel;

determining instants of the arrival of the signal forms from received signals by the mobile station to be synchronized; and using the instants and the type of signal forms by the mobile station for time synchronization with reference to time slot and frame.

2. A method for time synchronization of a mobile station of a radio communications system as claimed in claim 1, further comprising the step of:

designing the signal forms as training sequences of a message block with data to be transmitted.

3. A method for time synchronization of a mobile station of a radio communications system as claimed in claim 1, further comprising the step of:

spreading the signal forms with the aid of individual spread codes.

4. A method for time synchronization of a mobile station of a radio communications system as claimed in claim 1, further comprising the step of:

determining at least one of the instants by determining a correlation between a received signal and a reference sequence known in a receiver.

5. A method for time synchronization of a mobile station of a radio communications system as claimed in claim 1, further comprising the step of:

determining at least one instant by signal-matched filtering of a received signal.

6. A method for time synchronization of a mobile station of a radio communications system as claimed in claim 1, further comprising the steps of:

determining a plurality of instants of the arrival; and averaging the instants for the purpose of frequency synchronization.

7. A method for time synchronization of a mobile station of a radio communications system as claimed in claim 1, wherein the signal form includes data on a frame structure of the frequency channels in specific time slots.

8. A method for time synchronization of a mobile station of a radio communications system as claimed in claim 7, wherein the signal form, at specific instants of hyperframes and superframes, differs from the signal forms in remaining time slots of the frequency channel for time synchronization.

9. A method for time synchronization of a mobile station of a radio communications system as claimed in claim 7, further comprising the step of:
   supplementing the signal form with additional symbols at the start of hyperframes and superframes.

10. A mobile station of a radio communications system for use in connection with a method for time synchronization of the mobile station, wherein the radio communications system provides frequency channels which are formed both by time slots and by broadband frequency ranges and in which information from one or more connections is simultaneously transmitted between mobile stations and base stations, wherein information from different connections is distinguishable by spread codes, wherein one of the frequency channels is provided for repeated time synchronization of the mobile stations in a downward direction, and wherein a plurality of different known signal forms are transmitted within the one frequency channel in addition to information from further connections, the mobile station comprising:
   a signal processing device for determining instants of the arrival of the signal forms; and
   a control device for time synchronization taking account of the determined instants.

11. A base station for use in connection with a method for time synchronization of a mobile station of a radio communications system provides frequency channels which are formed both by time slots and by broadband frequency ranges and in which information from one or more connections is simultaneously transmitted between mobile stations and base stations, wherein information from different connections is distinguishable by spread codes, and wherein one of the frequency channels is provided for repeated time synchronization of the mobile stations in a downward direction, the base station comprising:
   a signal generating device for generating predetermined signal forms; and
   a transmitting device for transmitting the signal forms in the one frequency channel for time synchronization, wherein instants of the arrival of the signal forms are determined by the mobile station to be synchronized from received signals, and wherein the instants and the type of the signal forms are used by the mobile station for time synchronization with reference to time slot and frame.

12. A method for time synchronization of a mobile station of a radio communications system, the method comprising the steps of:
   providing frequency channels in the radio communications system which are formed both by time slots and by broadband frequency ranges wherein information from one or more connections is transmitted simultaneously in the frequency channels between mobile stations and base stations, and wherein the information from different connections is distinguishable by spreading codes;
   providing one of the frequency channels for repeated time synchronization of the mobile stations in a downward direction;
   transmitting, in addition to information from further connections, a plurality of different known signal forms within the one frequency channel;
   determining instants of the arrival of the signal forms from received signals by the mobile station to be synchronized by determining the instants of arrival several time and averaging the instants of arrival for the purpose of frequency synchronization; and
   using the instants and the type of signal forms by the mobile station for time synchronization with reference to time slot and frame.

13. A method for time synchronization of a mobile station of a radio communications system, the method comprising the steps of:
   providing frequency channels in the radio communications system which are formed both by time slots and by broadband frequency ranges wherein information from one or more connections is transmitted simultaneously in the frequency channels between mobile stations and base stations, and wherein the information from different connections is distinguishable by spreading codes;
   providing one of the frequency channels for repeated time synchronization of the mobile stations in a downward direction;
   transmitting, in addition to information from further connections, a plurality of different known signal forms within the one frequency channel;
   determining instants of the arrival of the signal forms from received signals by the mobile station to be synchronized by correlating the received signal with a reference sequence; and
   using the instants and the type of signal forms by the mobile station for time synchronization with reference to time slot and frame.

* * * * *